United States Patent
Sato et al.

[11] Patent Number: 5,723,222
[45] Date of Patent: Mar. 3, 1998

[54] HOT MELT ADHESIVES AND DISPOSABLE PRODUCTS UTILIZING THE SAME

[75] Inventors: Atsunori Sato, Sanda; Naohiro Maeda, Itami, both of Japan

[73] Assignee: National Starch and Chemical Investment Holding Corporation, Wilmington, Del.

[21] Appl. No.: 629,851

[22] Filed: Apr. 9, 1996

[30] Foreign Application Priority Data

Apr. 11, 1995 [JP] Japan .................... 7-085737

[51] Int. Cl.$^6$ .................... A61F 13/16; B32B 7/14
[52] U.S. Cl. .................... 428/483; 428/492; 428/511; 428/512; 428/513; 442/290; 442/398; 604/378
[58] Field of Search .................... 525/314; 442/290, 442/398; 428/492, 483, 511, 512, 513; 604/378

[56] References Cited

U.S. PATENT DOCUMENTS

| | | | |
|---|---|---|---|
| 4,526,577 | 7/1985 | Schmidt et al. | 604/366 |
| 4,944,993 | 7/1990 | Raykovitz et al. | 428/290 |

FOREIGN PATENT DOCUMENTS

| | | | |
|---|---|---|---|
| 0 330 764 | 3/1988 | European Pat. Off. | C08L 53/02 |
| 0 307 330 | 9/1988 | European Pat. Off. | C09J 3/14 |
| 0 358 907 | 7/1989 | European Pat. Off. | B42C 9/00 |
| 0 505 883 A1 | 3/1996 | European Pat. Off. | C09J 153/00 |
| 5-1023 | 1/1993 | Japan . | |

*Primary Examiner*—Ana Woodward
*Attorney, Agent, or Firm*—Ellen T. Dec

[57] ABSTRACT

In a hot melt adhesive comprising a thermoplastic block copolymer containing a block copolymer represented by formula (1) shown below (component A), tackifier (component B), diluent (component C) and stabilizer (component D), the content of component (A) is 10 to 40% by weight, the content of component (B) is 30 to 70% by weight, the content of component (C) is 30% by weight or less, and the content of component (D) is 0.1 to 4% by weight, all based on the total amount of said hot melt adhesive.

$$A_1\text{-}B\text{-}A_2 \quad (1)$$

wherein $A_1$ and $A_2$ are aromatic vinyl copolymer blocks having different molecular weights, and B is a conjugated diene polymer or hydrogenated derivative thereof;

Accordingly, the hot melt adhesive described above not only fulfills the basic requirements such as adhesiveness to a polyolefin film, stability, holding ability and low cost, but also exhibits an excellent low temperature adhesiveness and satisfactory handling during spray coating process.

7 Claims, No Drawings

HOT MELT ADHESIVES AND DISPOSABLE PRODUCTS UTILIZING THE SAME

[FIELD OF THE INVENTION]

The present invention relates to a hot melt adhesive used in production of disposable products such as paper diapers, and more particularly to a hot melt adhesive used preferably to bind a polyolefin film which is a major part of such disposal products to other parts.

[PRIOR ART]

Disposable products, such as paper diapers, sanitary napkins, gown for medical use and robes for surgical operation, have conventionally been used. Such products commonly employ resin films as their parts which serve as leakage-prevention sheets to prevent permeation of fluids. Because of durability and cost, polyolefin films are employed usually as such resin films. Various disposable products are produced by binding such polyolefin films to the parts, such as nonwoven or nonwoven fabrics, papers, rubbers and resins, using the hot melt adhesives.

For example, a paper diaper has a polyethylene film as a major part, which is bound to a woven fabric, elastic body such as naturally-occurring rubber, absorbent paper pad and the like using the hot melt adhesives, whereby producing the paper diaper. The binding process mentioned above can be conducted by T die coating, roll coating, multibead coating and the like, in which the hot melt adhesive is molten to a suitable viscosity and coated in the pattern of stripes or lines onto the polyethylene film part. Recently, spray coating method becomes to be used because it can bind a wide region with a small amount of the adhesive.

As mentioned above, an essential property of a hot melt adhesive employed in a disposable product is the ability of providing a satisfactory binding between a polyolefin film and other parts. Other properties required include better handling in coating process, no change in shape, texture or appearance after binding (stability), as well as sufficient holding of the shape of a product during use (holding ability). With regard to the better handling in coating process, a hot melt adhesive should undergo less change in viscosity and have less odor since it is in a molten state in the coating process. In addition, in view of the use in disposable products, a low price is another essential aspect of a hot melt adhesive. In cases of spray coating, in addition to the properties mentioned above, a high adhering ability and high tack force at a low viscosity are required, and these additional properties should be well balanced with a high precision. An adhering ability at a low temperature may also be an essential property considering the handling in a cool atmosphere such as in winter.

In an attempt to fulfill the requirements discussed above, various styrenic block copolymer-based hot melt adhesives are developed. Such styrenic block copolymers include, for example, styrene-butadiene-styrene (SBS)-based copolymers, styrene-isoprene-styrene (SIS)-based copolymers, styrene-ethylene/butyrene-styrene (SEBS)-based copolymers and styrene-ethylene/propylene-styrene (SEPS)-based copolymers. However, the hot melt adhesives employing SIS-based block copolymers mentioned above have extremely poor heat stability, and involve the problems of significant change in physical properties depending on the heating time period during the coating process. On the other hand, the hot melt adhesives employing SEBS or SEPS-based block copolymers are not suitable to disposable products since they are expensive. Accordingly, the hot melt adhesives employing SBS-based block copolymers as the base polymers became to be used mainly in these days.

An example of the hot melt adhesives employing SBS-based block copolymers mentioned above is that disclosed in Laid-open Japanese patent application Tokukaisho 60-158284. This hot melt adhesive employs a thermoplastic block copolymer of the multitype as a base polymer, and used as the multiline of a paper diaper in the examples disclosed in the patent application mentioned above.

Laid-open Japanese patent application Tokukaihei 2-91180 disclosed a hot melt adhesive containing a SBS-based block copolymer of the radial type as a base polymer.

Laid-open Notified Japanese patent application Tokukaihei 5-1023 disclosed a hot melt adhesive containing as a base polymer a SBS-based block copolymer containing SB diblock copolymer in a large amount.

However, the hot melt adhesives employing the SBS-based block copolymers do not have all of the properties required as discussed above although they fulfill some basic requirements. Thus, a hot melt adhesive employing as a base polymer a multi block copolymer, for example, involves the problem of poor adhering ability at a low temperature. On the other hand, a hot melt adhesive employing as a base polymer a radial block copolymer suffers from the poor adhering to a polyethylene film, poorly supports the shape of a product during use, and has no sufficient melt viscosity during the coating process. A hot melt adhesive employing as a base polymer a block copolymer containing SB diblock copolymer in a large amount has a low ability of adhering to a polyethylene film (holding ability) and a poor heat stability. In this hot melt adhesive employing as a base polymer a block copolymer containing SB diblock copolymer in a large amount, the ability of adhering to the polyethylene film can be enhanced by means of increasing the amount of the base polymer, but the problem with regard to the heat stability can not avoided and a low viscosity can not be achieved.

[OBJECTIVES OF THE INVENTION]

The present invention is established in view of the problems discussed above, and its objective is to provide a hot melt adhesive not only fulfilling the basic requirements such as ability of adhering to polyolefin films, stability, holding ability and low cost but also having the ability of adhering at a low temperature and the ability of being spray-coated, and to provide a disposable products employing such adhesives.

[DISCLOSURE OF THE INVENTION]

In order to achieve the objective mentioned above the first aspect of the present invention is a hot melt adhesive comprising:

(A) a thermoplastic block copolymer containing a block copolymer represented by formula (1):

$$A_1\text{-}B\text{-}A_2 \tag{1}$$

wherein $A_1$ and $A_2$ are aromatic vinyl copolymer blocks having different molecular weights, and B is a conjugated diene polymer or hydrogenated derivative thereof;

(B) a tackifier;

(C) a diluent; and, (D) a stabilizer, wherein, all based on the total amount of said hot melt adhesive, the content of component (A) is 10 to 40% by weight, the content of component (B) is 30 to 70% by weight, the content of component (C) is 30% by weight or less, and the content of component (D) is 0.1 to 4% by weight.

The second aspect of the present invention is a disposable product obtained by binding at least one part selected from the group consisting of woven fabrics, nonwoven fabrics, rubbers, resins and papers to a polyolefin film, in which the adhesive used in said binding is a hot melt adhesive described above.

Thus, we made much effort in studying on the components of and their contents in the hot melt adhesive and repeatedly tested the samples of the adhesives, for the purpose of not only fulfilling the basic requirements mentioned above but also improving the handling in spray coating process and the adhesion at a low temperature. As a result, we found that a hot melt adhesive comprising a thermoplastic block copolymer containing as a base polymer a block copolymer represented by formula (1) together with a tackifier, diluent and stabilizer in specified amounts fulfills the basic requirement mentioned above, has excellent and well balanced cohesiveness, low temperature adhesiveness and tackiness, and has a low melt viscosity and excellent handling in coating process and excellent heat stability, thus achieving the present invention.

The present invention is further detailed below.

A hot melt adhesive according to the present invention comprises a thermoplastic block copolymer containing a block copolymer represented by formula (1) (component A), tackifier (component B), diluent (component C) and stabilizer (component D).

The thermoplastic block copolymer as component A serves as a base polymer for the inventive hot melt adhesive, and contains a block copolymer represented by formula (1):

A$_1$-B-A$_2$  (1)

wherein A$_1$ and A$_2$ are aromatic vinyl copolymer blocks having different molecular weights, and B is a conjugated diene polymer or hydrogenated derivative thereof.

In formula (1) shown above, the conjugated diene polymer and its hydrogenated derivative represented by B include, for example, polybutadiene, polyisoprene, and polybutadiene is the most preferred because of excellent heat stability.

In formula (1), the aromatic vinyl copolymer blocks represented by A$_1$ and A$_2$ are polymer blocks such as polystyrene, poly-α-methylstyrene, poly-p-methylstyrene, poly-o-methylstyrene, poly-m-methylstyrene, poly-p-tert-butylstyrene and polydimethylstyrene vinyl naphthalene. Among these, polystyrene is preferable economically because of low price and commercial availability. As described above, the aromatic vinyl polymer blocks represented by A$_1$ and A$_2$ are different from each other in molecular weight.

When A$_1$ and A$_2$ are polystyrenes, the contents of the polystyrenes are preferably 15 to 50% by weight (hereinafter designated simply as %) based on the total amount of the thermoplastic block copolymer, and more preferably, 30 to 40%. Thus, a content less than 15% causes the tendency of reduction in the elasticity and the cohesiveness of the block copolymer represented by formula (1), which may lead to reduced adhesiveness and heat resistance of the hot melt adhesive. On the contrary, a content exceeding 50% causes the tendency of reduction in the pliability because of an unnecessarily high elasticity of the block copolymer represented by formula (1), which may lead to reduced tackiness and peel strength of the hot melt adhesive.

Examples of the block copolymer represented by formula (1) are SBS-based block copolymers, such as those represented by formula (2) shown below.

S$_1$-B-S$_2$  (2)

The content of the SBS-based block copolymer represented by formula (2) based on the thermoplastic block copolymer is usually 10 to 90%, and preferably 25 to 75%. Thus, at a content departing from the range specified above, expected advantage may not be obtained and the balance of high cohesiveness, high adhesiveness and high tackiness may become poor, and, furthermore, the low viscosity may not be maintained. When the molecular weight of S$_1$ block in formula (2) is greater than that of S$_2$ block and the total weight of S$_1$, B and S$_2$ components is 100%, then S$_1$ component is contained preferably in an amount from 14 to 35% and S$_2$ from 1 to 5%. Thus, a content of S$_2$ component exceeding 5% may cause poor adhesiveness of the hot melt adhesive at a low temperature.

The thermoplastic block copolymer containing a SBS-based block copolymer represented by formula (2) preferably has a viscosity of 650 cps or less in 25% solution in toluene (at 25° C., same applicable to the description below). Thus, by fulfilling this requirement, the hot melt adhesive obtained has a low viscosity and a high adhesiveness.

The thermoplastic block copolymers other than the SBS-block copolymers represented by formula (2) may by any of those compatible with the SBS-based block copolymers mentioned above, and may be employed in an admixture of the thermoplastic block copolymers having various structures. Examples of such thermoplastic block copolymers are those represented by formulae (3) to (7) shown below, wherein S denotes a polystyrene block and B denotes a butadiene block.

S-B-S  (3)

S-B-S-B  (4)

(5)

(6)

S-B  (7)

SBS-based block copolymers represented by formulae (3) to (7) can be obtained, for example, by preparing a S-B structure by living polymerization of anion polymerization followed by further polymerization employing various coupling reagents appropriately. The SBS-based block copolymers represented by formulae (3) to (7) thus obtained tend to have the two polystyrene block (S) having equivalent molecular weights. The SBS-based block copolymer represented by formulae (3) to (7) can be employed independently or in admixture with each other.

In a thermoplastic block copolymer in which a SBS-based block copolymer is employed together with a S$_1$BS$_2$-based block copolymer represented by formula (2), the viscosity in 25% solution in toluene is preferably 1000 cps or less, while a viscosity of 650 cps or less is particularly preferred as mentioned above. Thus, a viscosity exceeding 1000 cps may cause an unnecessarily high melt viscosity of the hot melt adhesive.

The content of the thermoplastic block copolymer as component A described above is usually 10 to 40%, preferably 15 to 35%, while the particularly preferred content is 20 to 30%. Thus, a content less than 15% may cause insufficient cohesiveness, while a content exceeding 40% may cause poor handling in coating process.

Examples of the tackifier as component B are naturally-occurring rosins, modified rosins, hydrogenated rosins, glycerol esters of naturally-occurring rosins, glycerol esters of modified rosins, pentaerythritol esters of naturally-occurring rosins, pentaerythritol esters of modified rosins, pentaerythritol esters of hydrogenated rosins, copolymers of naturally-occurring terpenes, three dimensional polymers of naturally-occurring terpenes, hydrogenated derivatives of copolymers of naturally-occurring terpenes, hydrogenated derivatives of three dimensional polymers of naturally-occurring terpenes, polyterpene resins, phenolic modified terpene resins, hydrogenated derivatives of phenolic modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, alicyclic petroleum hydrocarbon resins and hydrogenated derivatives of alicyclic petroleum hydrocarbon resins, which can be employed independently or in admixture with each other. Among these tackifiers, hydrogenated derivatives of resins are preferable because they are odorless and have good heat stability. When a hot melt adhesive according to the present invention is employed in a sanitary product such as sanitary napkins, the tackifiers mentioned above are preferably colorless or white and substantially odorless. In the present invention, the expression "substantially odorless" means that there is almost no odor as specified in independent regulation of Japanese association of sanitary material industries.

The content of the tackifier as component B described above is usually 30 to 70%, and preferably 45 to 65% based on the total weight of the hot melt adhesive. This range is established because of the reason that a content less than 30% causes reduced tackiness and adhesiveness of the hot melt adhesive while a content exceeding 70% causes brittleness of the hot melt adhesive, resulting in poor adhesiveness at a low temperature.

The diluent as component C described above is incorporated for the purpose of reducing the melt viscosity of the hot melt adhesive, imparting pliability and modifying adhesiveness.

As the diluent, plasticizing oils can be contemplated, which are used for the purpose of reducing the melt viscosity of the hot melt adhesive and imparting pliability. Examples of such plasticizing oil are paraffin oils, naphthenic oils, aromatic oils, and among these paraffin oils are preferable since they are colorless and substantially odorless. The content of the plasticizing oil is usually 30% or less and preferably 5 to 25% based on the total weight of the hot melt adhesive.

Waxes are also contemplated as the diluent described above, and used for the purpose of reducing the melt viscosity of the hot melt adhesive and modifying the adhesiveness. Examples of such waxes are petroleum derivatized waxes such as paraffin waxes and microcrystalline waxes as well as synthesized waxes, including low molecular weight polyethylenes and Fischer-Tropsch waxes.

The stabilizer as component D mentioned above is incorporated for the purpose of preventing reduction in molecular weight of the hot melt adhesive, gel-forming coloration and odor formation all due to heat. Such stabilizers may be antioxidants and UV absorbers. The UV absorbers are used in order to remove the fluorescence of the hot melt adhesive as well as to improve the light resistance. The antioxidants and UV absorbers are not particularly specified and may be any of those for hot melt adhesives employed in general sanitary products. For example, the antioxidants may be phenolic antioxidants, sulfur-based antioxidants, phosphorus-based antioxidants, and the UV absorbers may be benzotriazolic UV absorbers and benzophenone-based UV absorbers. The content of the stabilizer is usually 0.1 to 4%, and preferably 0.3 to 2.0% based on the total weight of the hot melt adhesive. Thus, a content less than 0.1% fails to provide expected effects of the stabilizer incorporated, while a content exceeding 4% does not provide effects corresponding to the increase in the amount and is economically disadvantageous.

A hot melt adhesive according to the present invention can be produced by incorporating components A to D in suitable amount and mixing while molten.

A disposable product according to the present invention is produced by binding at least one part selected from the group consisting of woven fabrics, nonwoven fabrics, rubbers, resins and papers to a polyolefin film using a hot melt adhesive mentioned above. The binding can be conducted by melting the hot melt adhesive, which is then coated to at least one of the polyolefin film and the part mentioned above, which are then bound by compressing to each other. The coating process can be conducted by T die coating, roll coating, multibead coating and spray coating, and the patterns of the coating may be stripes and lines.

As the polyolefin film mentioned above, polyethylene films are preferably because of durability and cost. The disposable products according to the present invention are not particularly limited and may be, for example, paper diapers, sanitary napkins, gown for medical use and robes for surgical operation.

[ADVANTAGE OF THE INVENTION]

As described above, a hot melt adhesive according to the present invention contains components A to D in certain amount. On the basis of such certain components incorporated in certain amounts, the hot melt adhesive according to the present invention has a high ability of adhering to polyolefin films and a low melt viscosity which enables excellent handing during a coating process, exhibits firm adhesion after binding and excellent ability of holding the product, all at a low cost. In addition to these properties required, the hot melt adhesive according to the present invention has a high adhesiveness and high tackiness at a low viscosity, which are well balanced. Accordingly, the hot melt adhesive according to the present invention can satisfactorily be applied to T die coating, roll coating and multibead coating, especially to spray coating which may provide a high operational efficiency. In addition the hot melt adhesive according to the present invention can satisfactorily used at a low temperature such as in winter since it has an excellent adhesiveness at a low temperature.

Since a disposable product according to the present invention is produced by binding a polyolefin film to another part using the hot melt adhesive mentioned above, the shape of the product can be maintained firmly, and the adhesion at the site of binding is very stable. In addition, an excellent handling of the hot melt adhesive during the coating process enables the disposable product according to the present invention to be produced efficiently, resulting in reduction in cost.

The present invention is further described in the following examples together with comparatives.

For use in examples and comparatives, the following materials were provided.

[JX-710, Japan Synthetic Rubber]
  SBS-based block copolymer containing $S_1BS_2$-based block copolymer represented by formula (2) shown above in the amount of 53%
  Polystyrene content: 33%
  Viscosity in 25% solution in toluene: 600 cps
[JX-710F, Japan Synthetic Rubber]
  SBS-based block copolymer containing $S_1BS_2$-based block copolymer represented by formula (2) shown above in the amount of 70%
  Polystyrene content: 32%
  Viscosity in 25% solution in toluene: 460 cps
[Stereon 840A, Firestone]
  Multiblock SBS-based block copolymer
  Polystyrene content: 43%
  Viscosity in 25% solution in toluene: 630 cps
[Kraton D-1122 X, Shell Chemicals]
  Radial-structured SBS-based block copolymer
  Polystyrene content: 37%
  Viscosity in 25% solution in toluene: 670 cps
[Kraton TR-1118, Shell Chemicals]
  Block copolymer containing 80% SB diblock
  Polystyrene content: 30%
  Viscosity in 25% solution in toluene: 850 cps
[Kraton TR-1107, Shell Chemicals]
  SIS-based block copolymer
  Polystyrene content: 14%
  Viscosity in 25% solution in toluene: 1450 cps
[Arkon M-100, Arakawa Chemical Industries Ltd.]
  Tackifier
[Regalrez 1018, Rika Harcules Inc.]
  Liquid tackifier
[MC oil S-32, Idemitsu Petrochemical Co., Ltd.]
  Diluent
[Sumilizer GM, Sumitomo Chemical Co., Ltd.]
  Antioxidant
[Sumilizer TPD, Sumitomo Chemical Co., Ltd.]
  Secondary antioxidant
[Sumilizer BP101, Sumitomo Chemical Co., Ltd.]
  Antioxidant
[JF-77, Johoku Chemical Co., Ltd.]
  UV absorber

[EXAMPLES 1 TO 6, COMPARATIVE 1 TO 6]

The materials shown in Tables 1 and 2 were incorporated in the amounts shown in the same tables and melted at about 150° C. to prepare hot melt adhesives.

[TABLE 1]

| | | (Parts by weight) Example | | | | | |
|---|---|---|---|---|---|---|---|
| | | 1 | 2 | 3 | 4 | 5 | 6 |
| Component A | JX-710 | 20 | 15 | 10 | — | — | — |
| | JX-707F | — | — | — | 10 | 25 | 30 |
| | Stereon 840A | — | 5 | 10 | — | — | — |
| | Kraton D-1122X | — | — | — | 10 | — | — |
| | Content of $S_1BS_2$ in base polymer | 53 | 39.75 | 26.5 | 35 | 70 | 70 |
| Component B | Arkon M-100 | 60 | 60 | 60 | 60 | 60 | 50 |
| | Regalrez 1018 | — | — | — | — | — | 15 |
| Component C | MC oil S-32 | 20 | 20 | 20 | 20 | 15 | 5 |
| Component D | Sumilizer GM | 0.3 | 0.3 | 0.3 | 0.3 | 0.3 | 0.3 |
| | Sumilizer TPD | 0.3 | 0.3 | 0.3 | 0.3 | 0.3 | 0.3 |
| | JF-77 | 0.3 | 0.3 | 0.3 | 0.3 | 0.3 | 0.3 |

[TABLE 2]

| | | (Parts by weight) Comparative | | | | | |
|---|---|---|---|---|---|---|---|
| | | 1 | 2 | 3 | 4 | 5 | 6 |
| Component A | Stereon 840A | 20 | — | — | — | 25 | — |
| | Kraton D-1122X | — | 20 | — | — | — | — |
| | Kraton TR-1118 | — | — | 20 | 25 | — | — |
| | Kraton TR-1107 | — | — | — | — | — | 25 |
| | Content of $S_1BS_2$ in base polymer | 0 | 0 | 0 | 0 | 0 | 0 |
| Component B | Arkon M-100 | 60 | 60 | 60 | 60 | 60 | 60 |
| | Regalrez 1018 | — | — | — | — | — | — |
| Component C | MC oil S-32 | 20 | 20 | 20 | 20 | 15 | 15 |
| Component D | Sumilizer GM | 0.3 | 0.3 | 0.3 | 0.3 | 0.3 | — |
| | Sumilizer TPD | 0.3 | 0.3 | 0.3 | 0.3 | 0.3 | — |
| | Sumilizer BP101 | — | — | — | — | — | 0.5 |
| | JF-77 | 0.3 | 0.3 | 0.3 | 0.3 | 0.3 | 0.3 |

The hot melt adhesives of Examples 1 to 6 and Comparatives 1 to 6 thus obtained were examined for their properties such as melt viscosity, adhesiveness at a low temperature, holding ability, tackiness and heat stability. The results are summarized in Tables 3 and 4 shown below. The properties listed above were examined by the methods described below.

[MELT VISCOSITY]

A hot melt adhesive was molten be heating and the viscosity at 160° C. was determined by using Brookfield thermocell viscometer.

[LOW TEMPERATURE ADHESIVENESS]

A polyester (PET) film having the thickness of 50 μm was coated with a hot melt adhesive at the coating thickness of 50 μm to obtain a sheet, which was cut into pieces each having the width of 2.5 cm, which were then laminated with polyethylene (PE) films having the thickness of 100 μm at 20° C. and then allowed to stand for a day at 10° C. The pieces were peeled at the tensile speed of 300 mm/min, and the tensile strength observed was recorded as the low temperature adhesiveness. In the table, Z represented that zipping was observed.

[HOLDING ABILITY]

A PET film having the thickness of 50 μm was coated with a hot melt adhesive at the coating thickness of 50 μm to obtain a sheet, which was cut into pieces each having the width of 2.5 cm which were used as test samples. The test samples were laminated with PE films having the thickness of 100 μm so that the adhesion area was 1.0 cm×2.5 cm, and each sample was allowed to stand at 40° C. while being placed under 1 kg load applied in the direction vertical to the adhesion plane. The time period elapsing until the load fell down was determined and recorded as the holding ability.

[TACKINESS]

A PET film having the thickness of 50 μm was coated with a hot melt adhesive at the coating thickness of 50 μm to obtain a sheet, which was cut into pieces of 2.5 cm×10 cm which were used as test samples. Each sample was made into a loop with the side of the tack (adhesive-coated surface) facing out and then brought to be in contact with a PE plate at 20° C. at the speed of 300 mm/min. Thereafter, the sample was peeled from the PE plate at the speed of 300 mm/min while determining the peeling strength, which was recorded as the tackiness.

[HEAT STABILITY]

30 g of a hot melt adhesive was placed in a glass jar, which was allowed to stand at 160° C. in a heat air circulating drier over the period of 24 hours. Then the melt viscosity was determined as described above, and % change in viscosity after drying was calculated based on the initial viscosity (before drying). Similarly, 30 g of a hot melt adhesive was placed in a glass jar, which was allowed to stand at 160° C. in the heat air circulating drier over the period of 72 hours to evaluate the color tone and odor qualitatively by means of organoleptic panel tests. With comparing the initial state of the hot melt adhesive, the results of the test of the color tone were designated as ○ when the color tone changed only slightly and as X when the color tone changed markedly, and the results of the test of the odor were designated as ○ when no odor was felt and as X when odor was felt.

[TABLE 3]

|  |  | Example |  |  |  |  |
|---|---|---|---|---|---|---|
|  | 1 | 2 | 3 | 4 | 5 | 6 |
| Melt viscosity (160° C., cps) | 1950 | 1860 | 1810 | 1610 | 2900 | 5380 |
| Low temperature adhesiveness (10° C., g/25 mm) | 2500 | 2600 | 2700 | 2400 | 2550 | 3070 |
| Molding ability (min) | 11 | 14 | 17 | 20 | 48 | 120 |
| 20° C. loop tack (aunce) | 100 | 95 | 90 | 90 | 120 | 60 |
| Heat stability Color tone | ○ | ○ | ○ | ○ | ○ | ○ |
| Heat stability Odor | ○ | ○ | ○ | ○ | ○ | ○ |
| % Change in viscosity* | −4 | −4 | −4 | −5 | −5 | −6 |

*: After 24 hours at 160° C.

[TABLE 4]

|  |  | Comparative |  |  |  |  |
|---|---|---|---|---|---|---|
|  | 1 | 2 | 3 | 4 | 5 | 6 |
| Melt viscosity (160° C., cps) | 1730 | 2000 | 1570 | 3100 | 5400 | 4000 |
| Low temperature adhesiveness (10° C., g/25 mm) | 1690 | 2500 | 1860 | 2200 | 810 | 3050 |
|  | Z |  |  |  | Z |  |
| Holding ability (min) | 19 | 4 | 6 | 13 | 220 | 11 |
| 20° C. loop tack (aunce) | 70 | 70 | 110 | 70 | 20 | 120 |
| Heat stability Color tone | ○ | ○ | ○ | ○ | ○ | X |
| Heat stability Odor | ○ | ○ | X | X | ○ | X |
| % Change in viscosity* | −4 | −6 | −6 | −5 | −5 | −51 |

*: After 24 hours at 160° C.
Z: Zipping

As evident from all the results indicated in Table 3, the hot melt adhesives of all examples had the melt viscosity within an appropriate range, satisfactory low temperature adhesiveness, holding ability and tackiness and excellent heat stability which were well balanced. On the contrary, the results indicated in Table 4 proved that none of the comparative hot melt adhesives fulfilled the requirements mentioned above, indicating poor balance. Typically, the hot melt adhesive of Comparative 1 had poor low temperature adhesiveness, and the hot melt adhesive of Comparative 2 had a poor holding ability. The hot melt adhesive of Comparative 3 had a poor holding ability and a poor heat stability as evaluated organoleptically as the odor. The hot melt adhesive of Comparative 4 had a poor heat stability as evaluated organoleptically. Especially, the hot melt adhesive of Comparative 4 had poorly balanced properties when compared with the hot melt adhesive of Example 5 which had the similar melt viscosity. The hot melt adhesive of Comparative 5 had a poor low temperature adhesiveness and tackiness, and the hot melt adhesive of Comparative 6 exhibited a significant reduction in % change in viscosity which is an index of the heat stability and poorly evaluated for the color tone and odor.

[EXAMPLE 7, COMPARATIVE 7]

In Example 7 paper diapers were prepared using the hot melt adhesive of Example 5, while they were prepared in Comparative 7 using the hot melt adhesive of Comparative 4. Thus, a polyethylene film formed in a certain shape, two tissue papers, absorbent pad (pulp), urethane elastic fiber and nonwoven fabric were provided. The absorbent pad was sandwiched with the two tissue papers to form a absorbent body. On the other hand, the polyethylene film was coated with the hot melt adhesive, on which the absorbent body was placed and bound together. The urethane elastic fiber was bound using the hot melt adhesive to form the expandable portions (gather) on the both sides of the absorbent body described above. In the gather thus formed, the expansion rate of the urethane elastic fiber is the magnitude of 2. The absorbent body was coated with the hot melt adhesive, on which the nonwoven fabric was placed with a wide margin around the absorbent body and bound, whereby producing a bound body in which the absorbent body was present between the polyethylene film and the nonwoven fabric. The bound body thus formed was cut into pieces in a certain shape to obtain the final paper diapers. The binding of each part using the hot melt adhesive was conducted by spray coating at 150° C. up to the thickness of 15 μm.

The paper diapers of Example 7 and Comparative 7 thus obtained were examined for the shape holding ability based on the creep characteristics described below.

[CREEP CHARACTERISTICS]

The gather portion of the paper diaper was isolated by cutting and then fixed as expanded entirely at 40° C. for 10 hours. The distance for which the urethane fiber was peeled (released) was determined and from this value % creep was calculated according to the formula shown below.

$$\% \text{ Creep} = \{1 - [\Delta d/(L-L/S)]\} \times 100$$

wherein L is the length as expanded entirely, S is expansion magnitude, and Δd is the distance of peeling.

% Creep of the paper diaper of Example 7 as determined above was 62% while that of Comparative 7 was 22%. Based on these results, the paper diaper of Example 7 was proved to exhibit an excellent shape holding ability even when placed at a high temperature. When the paper diaper was allowed to stand at 40° C. for 10 hours to macroscopically observe the change in appearance, the paper diaper of Example 7 exhibited no unusual change. On the contrary, the gather of the paper diaper of Comparative 7 was confirmed to undergo shrinking.

What is claimed is:

1. A disposable product obtained by binding at least one substrate selected from the group consisting of woven fabrics, nonwoven fabrics, rubbers, resins and papers to a polyolefin film characterized in that the adhesive used in said binding is a hot melt adhesive comprising:

(A) a thermoplastic block copolymer containing a block copolymer represented by formula (1):

$$A_1\text{-}B\text{-}A_2 \quad (1)$$

wherein $A_1$ and $A_{2j}$ are aromatic vinyl copolymer blocks having different molecular weights, and B is a conjugated diene polymer or hydrogenated derivative thereof;

(B) a tackifier;

(C) a diluent; and, (D) a stabilizer, wherein, all based on the total amount of said hot melt adhesive, the content of component (A) is 10 to 40% by weight, the content of component (B) is 30 to 70% by weight, the content of component (C) is 30% by weight or less, and the content of component (D) is 0.1 to 4% by weight.

2. The disposable article of claim 1 wherein the content of the block copolymer represented by formula (1) is 20 to 70% by weight based on the total amount of the thermoplastic block copolymer.

3. The disposable article of claim 1 wherein $A_1$ and $A_2$ in formula (1) are polystyrenes having different molecular weights and B is polybutadiene.

4. The disposable article of claim 3 wherein the content of the polystyrene is 30 to 40% by weight based on the thermoplastic block copolymer and the viscosity of the solution of the thermoplastic block copolymer dissolved at the concentration of 25% by weight in toluene (25° C.) is 650 cps or lower.

5. The disposable article of claim 1 wherein the tackifier as component (B) is at least one selected from the group consisting of hydrogenated derivatives of modified terpene resins, aromatic petroleum hydrocarbon resins, alicyclic petroleum hydrocarbon resins and hydrogenated derivatives of alicyclic petroleum hydrocarbon resins, and is colorless or white and substantially odorless.

6. The disposable article of claim 1 wherein the content of component (A) is 20 to 30% by weight.

7. The disposable article of claim 3 wherein the higher molecular weight polystyrene block copolymer is present in an amount of 14 to 35% and the lower molecular weight polystyrene block copolymer is present in an amount of 1 to 5%, the remainder to 100% by weight comprising the butadiene block copolymer.

* * * * *